US012271471B2

(12) United States Patent
Yankovskiy et al.

(10) Patent No.: US 12,271,471 B2
(45) Date of Patent: Apr. 8, 2025

(54) DETECTING THREATS BY MONITORING ENCRYPTION KEY ACTIVITY

(71) Applicant: Zettaset, Inc., Mountain View, CA (US)

(72) Inventors: Maksim A. Yankovskiy, Mountain View, CA (US); Tim Reilly, Pleasanton, CA (US)

(73) Assignee: ZETTASET, INC., Mountain View, CA (US)

( * ) Notice: Subject to any disclaimer, the term of this patent is extended or adjusted under 35 U.S.C. 154(b) by 293 days.

(21) Appl. No.: 17/668,593

(22) Filed: Feb. 10, 2022

(65) Prior Publication Data

US 2022/0261478 A1    Aug. 18, 2022

Related U.S. Application Data

(60) Provisional application No. 63/148,981, filed on Feb. 12, 2021.

(51) Int. Cl.
| | |
|---|---|
| *G06F 21/00* | (2013.01) |
| *G06F 3/023* | (2006.01) |
| *G06F 21/55* | (2013.01) |
| *G06F 21/60* | (2013.01) |
| *G06F 21/62* | (2013.01) |
| *H04L 9/40* | (2022.01) |

(52) U.S. Cl.
CPC ............ *G06F 21/552* (2013.01); *G06F 3/023* (2013.01); *G06F 21/602* (2013.01); *G06F 21/6209* (2013.01); *H04L 63/20* (2013.01)

(58) Field of Classification Search
CPC ...... G06F 21/552; G06F 3/023; G06F 21/602; G06F 21/6209; G06F 21/554; H04L 63/20; H04L 63/1408
See application file for complete search history.

(56) References Cited

U.S. PATENT DOCUMENTS 8,555,404 B1 * 10/2013 Sebes ...................... H04L 63/10
726/27
10,110,383 B1 * 10/2018 Tamilarasan .......... H04L 9/3297
(Continued)

OTHER PUBLICATIONS

IBM, "Activity Tracker Events", https://cloud.ibm.com/docs/key-protect?topic=key-protect-at-events, pp. 1-17, Feb. 12, 2021, IBM, Armonk, NY, USA.
(Continued)

*Primary Examiner* — Kendall Dolly
(74) *Attorney, Agent, or Firm* — Asif Ghias (57) ABSTRACT

Techniques are taught for detecting threats to data by monitoring encryption key activity. The disclosed techniques include methods and systems for collecting and analyzing encryption key activity, relating this activity to object data and comparing it against a defined policy. They also include reporting policy violations in the form of notifications and alerts. Distributed implementations of the present techniques deploy various modules and services at remote/local as well as global/central sites. When network connectivity between a remote site and a central site is unreliable, a local policy engine and a local activity analyzer service monitor key activity at the remote site and detect policy violations. When network connectivity is restored, they synchronize with their global counterparts.

20 Claims, 4 Drawing Sheets

(56) References Cited

U.S. PATENT DOCUMENTS

| | | | | |
|---|---|---|---|---|
| 10,341,321 | B2* | 7/2019 | Kumar | H04L 63/08 |
| 10,990,455 | B2* | 4/2021 | Gilling | G06F 11/302 |
| 11,507,283 | B1* | 11/2022 | Olson | G06F 16/909 |
| 2009/0092252 | A1* | 4/2009 | Noll | H04L 9/083 |
| | | | | 380/277 |
| 2015/0086020 | A1* | 3/2015 | Harjula | H04L 63/062 |
| | | | | 380/279 |
| 2018/0205610 | A1* | 7/2018 | Imperia | G06F 11/3006 |
| 2019/0074967 | A1 | 3/2019 | Stuntebeck et al. | |
| 2019/0075134 | A1* | 3/2019 | Ylonen | H04L 63/0442 |
| 2019/0098037 | A1* | 3/2019 | Shenoy, Jr. | H04L 63/1441 |
| 2020/0159624 | A1* | 5/2020 | Malkov | G06N 20/00 |

OTHER PUBLICATIONS

IBM, "Monitoring The Lifecycle Of Encryption Keys", https://cloud.ibm.com/docs/key-protect?topic=key-protect-key-states, pp. 1-6, Feb. 12, 2021, IBM, Armonk, NY, USA.

Openstack, "Object Encryption—OpenStack", https://wiki.openstack.org/wiki/ObjectEncryption, pp. 1-8, Feb. 25, 2021, Open Infrastructure Foundation (https://openinfra.dev/), Austin, TX, USA.

Shan, "How To Know Container Name With Marathon Rest API", https://stackoverflow.com/questions/28681235/how-know-container-name-with-marathon-rest-api, pp. 1-4, Stackoverflow.com, New York, NY, USA.

Thales, "CipherTrust Transparent Encryption", https://thalesdocs.com, pp. 1-83, Document 1, Version 1, Sep. 22, 2020, https://thalesdocs.com, Baltimore, MD, USA.

* cited by examiner

DETECTING THREATS BY MONITORING ENCRYPTION KEY ACTIVITY

RELATED APPLICATIONS

This application claims priority from U.S. Provisional Patent Application No. 63/148,981 filed on Feb. 12, 2021 and which is incorporated by reference herein for all purposes in its entirety.

FIELD OF THE INVENTION

This invention generally relates to the field of data protection and more specifically for detecting threats by monitoring key encryption activity and detecting policy violations caused by the key activity.

BACKGROUND

Detection of attacks on enterprise data is critical to mounting timely and appropriate response to the threats. Since data is the most valuable possession of any enterprise, great care is taken when protecting it from the time it is created and through all the enterprise processes. Various methods of data protection are usually employed. These include encryption, obfuscation, tokenization, network and user activity monitoring to name a few. As enterprises run multiple systems, such as payroll, accounting, HR, development, test, etc., they usually deploy numerous and often disconnected solutions to protect enterprise data.

For encrypted environments, there is prior art for monitoring the use of encryption keys. U.S. Patent Publication No. 2019/0075134 A1 to Ylonen teaches techniques for key use monitoring by managing automated access to computers via secure shell protocol (SSH) user keys and other types of trust relationships. It also provides for managing certificates, Kerberos credentials and cryptographic keys. Certain implementations provide for remediating legacy SSH key problems and for automating configuration of SSH keys, as well as for continuous monitoring.

U.S. Pat. No. 10,110,383 B1 to Tamilarasan discloses techniques for managing embedded and external key management systems in a data storage solution. For this purpose, an embedded encryption key management system is selected. A first unique signature is generated using a time parameter and a randomly generated value. A backup copy of a lockbox is created, wherein access to the backup copy of the lockbox requires providing a minimum number of unique data storage system values. The encryption key management system is then switched to an external mode.

A second unique signature is generated for use with the local lockbox wherein the signature is generated using a time parameter and a randomly generated value. The encryption key management system is then switched back to embedded mode and a third unique signature is generated for use with the local lockbox. Again, this signature is generated using a time parameter and a randomly generated value. Furthermore, U.S. Patent Publication No. 2009/0092252 A1 to Noll describes a system and method for managing encryption keys, wherein one or more of the keys incorporates a disabled state, and wherein the system further incorporates a namespace.

There is also prior art for monitoring encryption key states as defined by the Key Management Interoperability Protocol (KMIP). As encryption keys transition from one state to another, an event such as an alert or a notification can be generated. The product of Key Protect for IBM Cloud™ by International Business Machine (IBM) provides for monitoring the lifecycle of encryption keys. Furthermore, IBM Cloud Activity Tracker product working with Log DNA can be used to track how users and applications interact with their Key Protect product.

While the above prior art teachings provide for some monitoring, they are deficient and lacking at least because of the following reasons:
- They are vendor and environment specific. For instance, only IBM Cloud™ and IBM Key Protect products may be supported.
- They are unable to translate key state transitions to meaningful key management activity events.
- They also require specialized knowledge of software security.
- They are also unable to associate or correlate object data to the generated key activity.

OBJECTS OF THE INVENTION

In view of the shortcomings of the prior art, it is an object of the invention to provide techniques for monitoring key management activity or simply key activity correlated with object data, for comparing it against defined policies.

It is further an object of the invention to detect any policy violations and generate appropriate alerts and notifications.

It is also an object of the invention to provide the above capabilities transparently to the client applications by utilizing an application proxy.

It is also an object of the invention to save the key activity log securely.

It is further an object of the invention to support deployments in distributed environments where network connectivity between a central site and remote sites/locations is unreliable.

Still other objects and advantages of the invention will become apparent upon reading the summary and the detailed description in conjunction with the drawing figures.

SUMMARY OF THE INVENTION

A number of objects and advantages of the invention are achieved by apparatus and methods for monitoring encryption key management activity in order to detect threats to encrypted data. For this purpose, an application proxy module or service is deployed on an application server operating a client application which generates key management events or activity or more simply just key activity. Thus, the application proxy intercepts any key activity of interest generated by the client application or simply the application.

Exemplary key activity of interest for the instant application proxy to intercept includes a volume-create request/event and a volume-attach request/event. The former requests a key manager to create an encryption key for a newly created volume. The latter requests the key manager to provide the encryption key of an existing encrypted volume that is being attached by the requesting container.

Such key activity is directed to or destined for a key manager. However, the instant application proxy intercepts it and uses an application programming interface (API) of an activity collector module/service to securely log the key activity data. Key activity data representing the key activity includes any requisite data associated with the key activity request/event including any specified encryption key. It also includes or is correlated to object data associated with the storage object to which the request and/or the key pertains.

After interception of the key activity of interest and logging of the key activity data, application proxy resends/redirects the key activity to its original recipient/destination, that is, the key manager. Both the application proxy and activity collector preferably operate efficiently, so as to cause minimal performance degradation for the client application. In the preferred embodiment, the key manager is a key management interoperability protocol (KMIP) compliant key manager.

There is also a policy engine for defining one or more security policies and for comparing the key activity data against the policies in order to detect any violations. Each such policy includes one or more policy definitions or rules or entries. The policy engine provides a user interface (UI) for managing the policies, including updating/editing the policy entries of existing policies, creating new policies, deleting policies, etc.

The policy engine compares the key activity data logged above against existing active policies. It then reports any policy violations to an activity analyzer module or service. In some embodiments, the policy engine only reports violations to the activity analyzer while in other embodiments it reports all key activity data to the activity analyzer. The types of key activity that the policy engine communicates to the activity analyzer is configurable by an administrator.

In case of any violations reported by the policy engine, the activity analyzer then alerts the designated parties, which may be users/administrators or other systems/applications. The activity analyzer may also perform further analysis on key activity data. This includes machine learning and other statistical analysis techniques that may detect/predict anomalies in the key activity data.

In some embodiments the application proxy is installed as a service on every node of a networked computing environment. In a preferred embodiment, the key activity data log created by the logging API of the activity collector is an unmodifiable log. What this means is that any tampering with the log can be easily detected by an application reading the log. In another preferred embodiment, the log is also an append-only log.

In another highly preferred set of embodiments, the present technology is deployed in a distributed environment. The distributed environment consists of a central or globally distributed environment or site, and a local or remote site that is separate from the central or global site. These embodiments are highly suitable for deployments where there are remote sites that have intermittent or unreliable network connectivity with the central site. Exemplarily, such remote sites may operate internet-of-things (IoT) devices that generate sensitive IoT data which needs to be protected.

In such distributed deployments, there is a local policy engine and a local activity analyzer at each local/remote site, with their global counterparts at the central site. Working together, the local policy engine and the local activity analyzer monitor key activity data at the remote site and detect violations of policies that are locally critical at the remote site.

The present distributed embodiments provide this local monitoring capability at local/remote sites that may be disconnected at times from the central or global environment. In some variations, the locally critical policies may also be enforced and not just monitored. In such a scenario, any violating key activity requests are denied and reported. Then, once network connectivity to the central/site is restored, the local policy engine and local activity analyzer synchronize with their global counterparts at the global/central site or environment.

Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The techniques described herein may employ computer code that may be implemented purely in software, hardware, firmware or a combination thereof as required for a given implementation. The present disclosure describes techniques and methods for collecting and analyzing encryption key activity, comparing this activity against one or more defined security policies and reporting on events and exceptions that violate the policies. The techniques of the present technology are suitable for environments employing data encryption with a key management infrastructure. Such environments employ a key management system (KMS) or more simply a key manager (KM).

Figure 1:
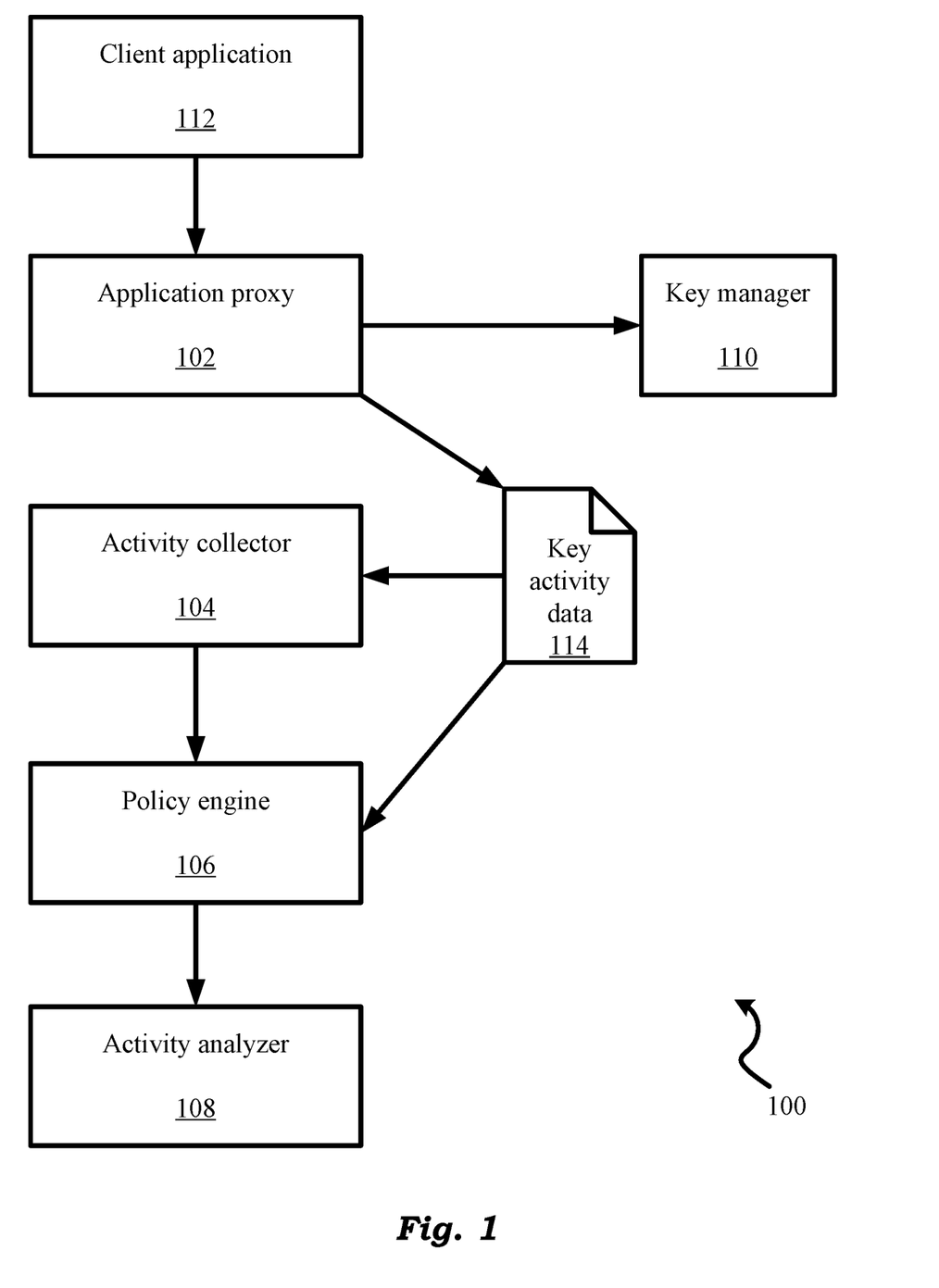
FIG. 1 shows a block diagram view of a cryptographic key-based threat monitoring system of the present technology.

The present invention will be best understood by first reviewing the systems and methods for monitoring threats to data by collecting and analyzing encryption key activity as illustrated in FIG. 1. More specifically, FIG. 1 shows a system 100 for monitoring threats to data and includes the following components or modules. These components may communicate with each other via messages or by files or by any other suitable form of communication scheme.

1. Application Proxy. Application proxy component/module 102 is responsible for intercepting encryption key management activity generated by an application, such as client application 112 shown in FIG. 1. For brevity we may usually refer to key management activity as simply key activity in this disclosure. Application proxy 102 is then responsible for providing the intercepted key activity to activity collector 104 discussed further below. Client application 112 may be any application of interest that accesses or generates sensitive data that needs to be protected.

Exemplary encryption key activity intercepted by application proxy 102 includes any type of key management activity. This includes key creation requests, key deletion/destruction or revocation requests, as well as requests for obtaining the encryption or cryptographic key of an encrypted object. The preferred embodiment employs a KM 110 that is compliant with the Key Management Interoperability Protocol (KMIP) standard. As such, the activity requests/calls generated by the application are KMIP-compliant.

In the absence of application proxy 102, such key activity requests/calls or simply key activity is sent by client application 112 directly to KM 110. Using the present design however, application proxy 102 intercepts this key activity and gathers key activity data for activity collector 104. After collecting and logging the requisite key activity data, application proxy 102 redirects the original key activity requests/calls to their intended destination, namely KM/KMS 110. FIG. 1 shows the key activity data logged by application proxy 102 by reference numeral 114. This data may be stored as files, tables or in any other appropriate storage construct.

In the preferred embodiment, application proxy 102 takes the form of an application programming interface (API) library that is installed on the same system as client application 112 that is generating the key activity. In such a scenario, application proxy 102 replaces the application library responsible for interacting with KM 110.

After intercepting the key activity discussed above, application proxy 102 saves or logs the key activity data representing the key activity. The key activity data includes any relevant data about the storage objects associated with the request. More precisely, we refer to key activity data 114 of FIG. 1 as including data related to an existing encryption key as well as data related to a request for a new encryption key.

Furthermore, and importantly, key activity data 114 also includes any relevant data about the storage object itself that an existing encryption key is associated with or related to, or for which a new key is being requested. In other words, the present design correlates key activity data to the object data in question. Key activities of interest for the instant threat monitoring system are those that involve or are associated with or related to an encryption key.

Examples of object data included in such key activity data includes the name/id of the container and/or the volume, the name/id of the file or the name/id of the cloud object, or the name/id of any other object associated with or encrypted/decrypted by the key.

Let us consider an exemplary implementation of the present technology in a computing environment that uses a container management system with encrypted data. In such an environment, when a container attaches an encrypted data volume, exemplary key activity data 114 gathered and saved by application proxy 102 of FIG. 1 includes:
{application_id, container_name, volume_id, encryption_key_id, encryption_key_event="get", application_event="volume_attach"}.

In the above example, the requesting container is in turn requesting key manager 110, the encryption of the encrypted volume being attached. As another example, when a container sends a request to create an encrypted data volume, following key activity data 114 is intercepted and logged by application proxy 102. In this example, the container is in turn requesting KM 110 to create a new encryption key for a newly created volume:
{application_id, container_name, encryption_key_event="create_and_activate", application_event="volume_create"}.

In non-containerized environments operating the present technology also, appropriate volume-create and volume-attach requests are intercepted by application proxy 102.

Upon interception of above key activity requests/calls, application proxy 102 logs key activity data 114 that is used or consumed by activity collector 104 discussed further below. In a preferred embodiment, application proxy 102 calls an application programming interface (API) of activity collector 104 for saving key activity data 114. The API of activity collector 104 then saves activity data 114 in a secure log. This secure logging capability of activity collector 104 is discussed in detail further below.

Application proxy 102 may take the form of a "shim" compatibility layer in various embodiments. In some embodiments, application proxy 102 is a service that is configured to monitor an audit log of KM 110. In such a scenario, application proxy service 102 harvests the requisite key activity data from the KM audit log and logs it as key activity data 114.

In yet another embodiment of the present technology, application proxy 102 is a service that runs on every node of a networked computing environment. In such a scenario, the administrator redirects all encryption key activity calls/requests originating from a client application on any node, to application proxy 102. In the absence of instant proxy 102, these calls/requests would otherwise be sent directly to the KMS. As before, application proxy 102 then saves the requisite key activity data for activity collector 104. It then relays these calls/requests to KM 110.

An additional feature of instant application proxy 102 is that it can be used to convert non-standard key management requests to an industry standard such as KMIP. In such a scenario, while saving/logging key activity data 114 per above, application proxy 102 performs any requisite data transformations of key activity data 114 that are needed to conform it to the KMIP standard/protocol. This capability enables the instant design to interoperate between a non-standard key management environment and industry-standard key management systems.

2. Activity Collector. An activity collector shown by reference numeral 104 in FIG. 1 is a module or service that receives or consumes key activity data 114 gathered by application proxy 102. In a preferred embodiment, application proxy 102 calls a (logging) API of activity collector 104 to securely log key activity data 114.

As noted, key activity data 114 represents any key management activity or requests that involve an encryption key. These include key revocation or deletion/destruction requests specifying an existing encryption key and key creation requests that result in the creation of a new key. These also include requests for obtaining encryption key of an encrypted volume or storage object. Furthermore, key activity data 114 includes relevant data of the storage object in question to which the encryption key pertains or is associated with.

Per above, activity collector 104, and more specifically its above-mentioned logging API, is responsible for securing key activity data 114 such that it cannot be tampered with by a malicious party. Key activity data 114 is saved securely in a log. Preferably, the log is an unmodifiable log. In other words, any unauthorized changes to the logs are easily detectable by an application reading it. Preferably still, the log is an append-only log. In a preferred embodiment, this is accomplished by the logging API by signing each log entry using a well-known hash algorithm, such as SHA-256, to prevent the modification of individual log entries.

Furthermore, the API also signs the entire log file using the same or a different hash algorithm. These signatures are verified every time an entry is appended to the log file as well as every time an entry is read from the log file. The present design admits of other secure and unmodifiable append-only logging schemes that may be employed by activity collector 104 and more specifically its logging API to securely save key activity data 114.

Activity collector 104 then provides key activity data 114 to policy engine 106 for detecting policy violations as discussed further below. In a preferred embodiment, the key activity data is provided to policy engine 106 on an event-driven basis. In such a scenario, key activity requests/events are passed onto policy engine 106 as application proxy calls the logging API of activity collector 104 for logging these events in key activity data 114.

Thus, taking the above examples of a container attaching an encrypted volume and a container requesting the creation of an encrypted volume, these events are immediately passed onto policy engine 106. The communication of key activity data to policy engine 106 may take the form of messages, or alternatively files, tables, etc.

Alternatively still, key activity data 114 may also be provided to policy engine 106 on a batch basis. Such a capability is useful when there is unreliable or intermittent communication between a local/remote site operating activity collector 104 and a global policy engine 106 operating at a global/central site. The implementation of the present technology in remote/disconnected environments will be discussed further below in reference to FIG. 4.

Regardless, the main responsibility of policy engine 106 is to apply received key activity data 114 against the active security policies and report any violations. Let us now look at the working of policy engine 106 in greater detail.

3. Policy Engine. Policy Engine 106 shown in FIG. 1 is a module or service that is responsible for managing security policies or simply policies. These policies are created by authorized users, such as administrators. The main responsibility of policy engine 106 is to determine whether or not a key activity event or a set of key activity events or more simply just key activity, received/read from activity collector 104 is in violation of one or more security policies.

A policy consists of one or more policy definition entries or rules. Each entry/rule of a policy specifies a key activity/operation/event that is acceptable/allowable by the policy. In addition, an entry may also specify an acceptable property or attribute of the key activity per the policy. Exemplarily, such a property is the number of allowable times per period, date/time intervals, etc. during which the specified key activity is allowed to occur.

The above entries/rules and associated properties/attributes may specify as to what is allowable and/or also as to what is not allowable by the policy. Exemplarily, the later may be accomplished by specifying a "!" or "-" operator before a rule. A number of such rules/entries comprise a policy. Each policy may exist in its own file or a number of policies along with their rules/entries may be included in a single file. Exemplarily, the policy file(s) may be human-readable and human-editable text files, although they may also be only machine-readable binary files. Of course, the policy files are secured in a manner so as to only allow authorized applications or users to make any changes/additions/updates or even to view the policies.

As noted, policy engine 106 is also in charge of managing or maintaining these policies. In the preferred embodiment, policy engine 106 includes an appropriate user interface (UI), such as a command line interface (CLI) or a graphical user interface (GUI). Such an interface enables an authorized user, such as an administrator, to view and edit the policies defined in the system. There may also be a hierarchical access control based on the roles and privileges of various users in the organization that determines which users are allowed to view and/or edit what policies.

A policy entry/rule/definition specifies/defines a certain key activity that is allowed by the policy. For example, an entry in a policy can be used to specify that a sales application is never allow to attach a container volume that is run by the human resource (HR) department. A policy entry/rule can also specify the allowable number of key activities. A policy can also define the allowable date/time period or intervals in which the specified key activities are allowed to occur. A policy can also define an allowable rate of occurrence of various key activities.

As another example, a policy can specify that a payroll application can only attach to a human resources (HR) data volume up to 3 times in the last 3 days of each month. In such a scenario, the payroll application does so in order to run a monthly payroll. Another example of a policy definition can specify that the number of volume-attach events sent to KM 110 may not exceed 50 per day and may only occur between 8 am and 5 pm on weekdays.

Referring still to encryption key activity-based threat monitoring system 100 of FIG. 1, policy engine 106 receives or reads key activity data 114 securely saved by activity collector 104 and more specifically its logging API. It then determines if any key activities are in violation of one or more policy rules/entries/ definitions defined in/by policy engine 106. If a violation is detected, an appropriate alert or notification is sent to the user/administrator or an appropriate system/application.

In one embodiment, policy engine 106 itself sends such alerts. It is possible that a certain key activity is in violation of multiple policy definitions or policy definitions in multiple policies. In the present embodiment, policy engine 106 sends appropriate alert(s) to the pertinent users of the organization and/or to other systems/applications to report the policy violations.

In other embodiments, policy engine 106 reports such violations to another module. In a variation, the receiving module is a key management console server. Console server then displays these violation events as they occur as indicators in its encryption key view and object information view.

In the preferred embodiment however, policy engine 106 reports all such violation events to an activity analyzer 108 (discussed further below). In a related variation, policy engine 106 sends activity analyzer 108 all allowed as well as violating key activity data 114 against active or deployed policies. In other words, it informs activity analyzer about all key activities, whether or not they are in violation of one or more policies and more specifically their policy definitions/entries/rules.

4. Activity Analyzer. Policy engine 106 communicates with activity analyzer 108 using one or more suitable communication schemes, including messages, files, tables, etc. More specifically, policy engine 106 communicates key activity data 114 to activity analyzer 108. Based on techniques known in the art, activity analyzer 108 then performs further analysis on the key activities and reports any observed/detected or predicted anomalies. For this purpose, it may apply machine learning (ML) and/or artificial intelligence (AI) algorithms and or other analytical or statistical techniques.

Architecture, Setup and Configuration

Figure 2:
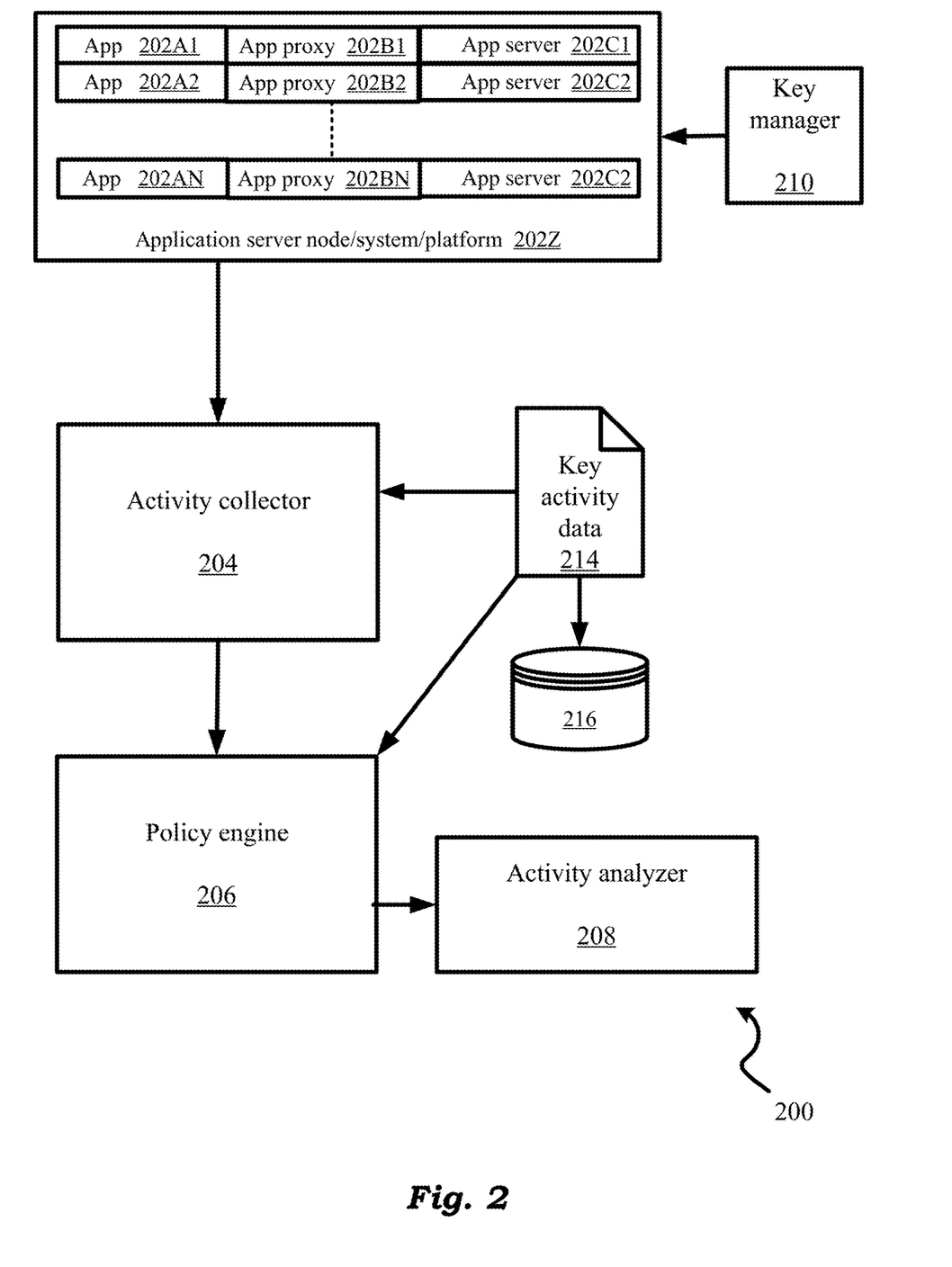
FIG. 2 shows a more detailed architectural view of an embodiment of an encryption key-based threat monitoring system based on the instant principles.

Let us now review a preferred architecture, and the steps required to set up and configure threat monitoring system 100 shown in FIG. 1. For this purpose, let us take advantage of the embodiment shown in FIG. 2. FIG. 2 shows a key activity-based threat monitoring system 200 that consists of an instance of application proxy 202B1, 202B2, ..., 202BN for every application 202A1, 202A2, ..., 202AN respectively. In practice, applications 202A are any applications generating key management/activity requests or events that would result in encryption key activity data 114 discussed in reference to FIG. 1 above.

Per above teachings, application proxies 202B intercept key activities destined for key manager 210 and log pertinent key activity data 214. In the preferred embodiment, they log key activity data 214 by calling a logging API of activity collector 204. Key activity data 214 may be stored as files or as one or more data constructs/structures in a datastore or database 216. Such data constructs/structures may take the form of tables when database 216 is a relational database.

In the preferred embodiment, each application, such as application 202A1 and corresponding application proxy 202B1 are running on a dedicated application server 202C1 as shown. Similarly, there is an application 202A2 with application proxy 202B2 running on application server 202C2 and so on. However, in other embodiments, there may be more than one applications 202A and respective proxies 202B sharing a single application server. Conversely, there may be more than one application servers serving a single application, such as application 202A5 with application proxy 202B5.

Furthermore, depending on the architectural requirements of a given implementation, application proxies 202B, computing applications 202A and application servers 202C may be executing on a single server node or hardware or box or machine or platform 202Z as shown. Alternatively, they may share the underlying hardware or platform with other modules and sub-systems. They may also be deployed on multiple nodes in a high availability (HA) architecture known in the art.

Regardless, one or more system and application administrators install and configure the various systems, modules and sub-systems shown in FIG. 2. Let us now review this setup process by taking advantage of flowchart 300 shown in FIG. 3 in conjunction with FIG. 2. Various steps shown in FIG. 3 may be performed in parallel or in a different order than the one shown for the preferred embodiment in FIG. 3, but still within the scope of the instant principles.

Figure 3:
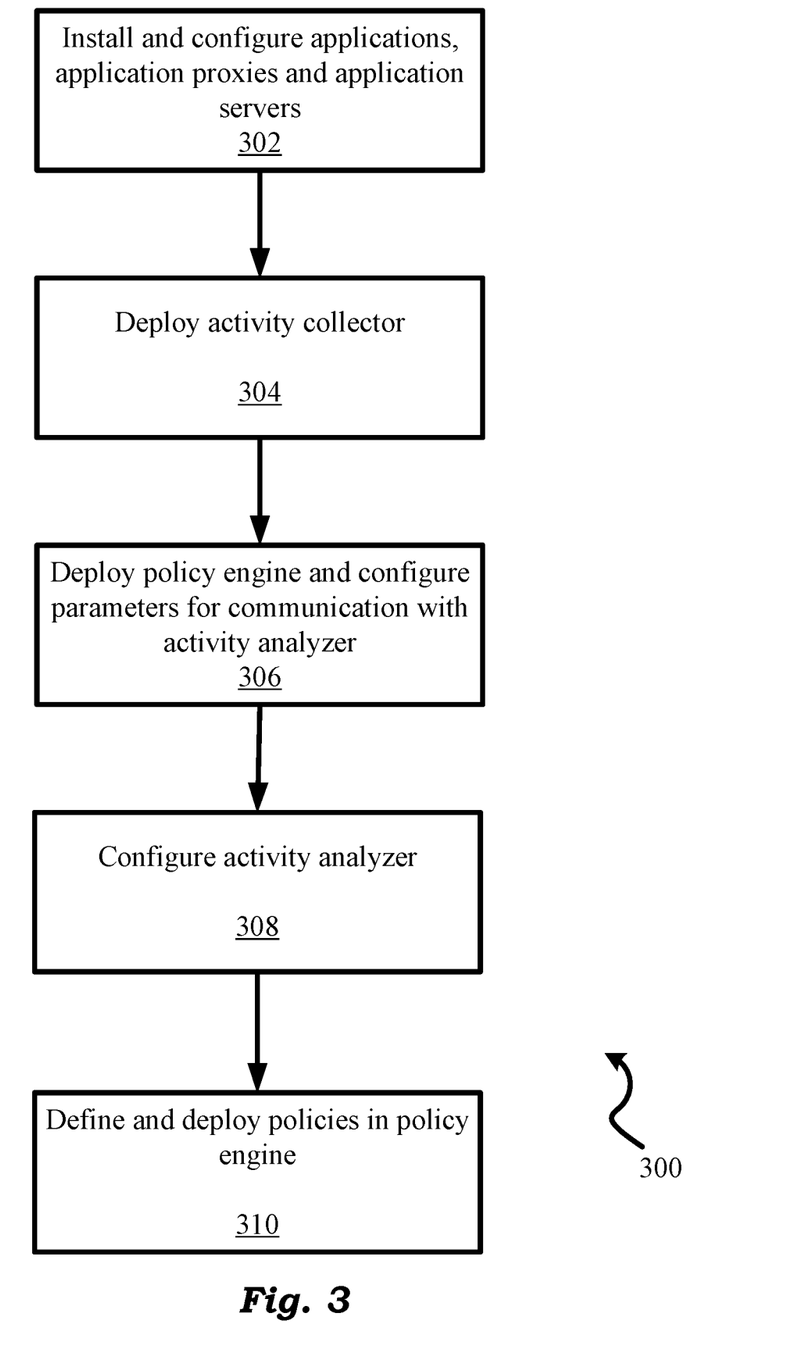
FIG. 3 shows in a flowchart or a flow diagram form the steps required to setup and configure the threat monitoring system of FIG. 2.

In first step 302, applications 202A, application proxies 202B, along with application servers 202C are installed and configured by the administrator(s). Then at step/box/block 304, an activity collector 204 is deployed. Activity collector 204 may be deployed as a single instance or as multiple instances for high availability (HA) based on techniques known in the art. In a similar fashion, in step 306, policy engine 206 is deployed as a single instance or as multiple HA instances.

Further, in step/box/block 306 the administrator(s) configure policy engine parameters that determine which key activities or events policy engine 206 will communicate to activity analyzer 208. Recall from the above discussion of FIG. 1, that policy engine 206 may communicate only violating key activities to activity analyzer 208 or alternatively all key activities. Any desired key activity events/requests or more simply key activity/activities may be configured to be communicated by policy engine 206 to activity analyzer 208 of FIG. 2, at step 306 of FIG. 3.

At step 308 activity analyzer 208 is configured. This configuration determines which users/parties will be alerted/notified when various policy violations occur. In the preferred implementation, users are alerted in accordance with the policy violation that pertains to them based on their roles/privileges. For instance, a payroll administrator should be alerted when a marketing system attempts to attach a payroll container volume, but not necessarily when a development system attaches a human resource volume.

At step 310, administrators define the policies in policy engine 206 per above teachings. The policies are defined according to the organizational guidelines and objectives. Once a policy is defined and reviewed, it is finally deployed whence it becomes active in the threat monitoring system 200 of FIG. 2.

Following step 310, the administrators may also decide upon incident response policies that determine what response will be taken and by who when policy violations occur. Note that this step is outside the purview of threat monitoring system 200 of FIG. 2 and may involve other systems/personnel and HR activities. It is therefore not shown in flowchart 300 of FIG. 3.

Distributed Implementations/Deployments

Let us now review a deployment architecture of the present technology that is especially suitable for remote and disconnected environments where network connectivity is unreliable. For this purpose, let us take advantage of an encryption key activity-based threat monitoring system 400 shown in FIG. 4. Threat monitoring system 400 shown in FIG. 4 is a variation of FIG. 2 with a local/remote operating environment or site or location 400A and a global or globally distributed operating environment or site 400B as shown.

In various embodiments, operating environment 400B may be a corporate location, or a central data center. Further still, computing systems of environment 400B may be dispersed upon more than one geographical location, such as multiple data centers, or on multiple servers. Operating environment 400A is an environment that is remote or at a site that is geographically separate from the corporate or central environment of 400B.

Moreover, network communication between local/remote site 400A and global site 400B may be unreliable or disconnected at times. An example of such a remote site may be an oil rig or a construction site that generates sensitive internet-of-things (IoT) data that needs to be protected. There may be many such remote or local environments 400A1, 400A2, . . . working in conjunction with a central or global environment 400B.

Figure 4:
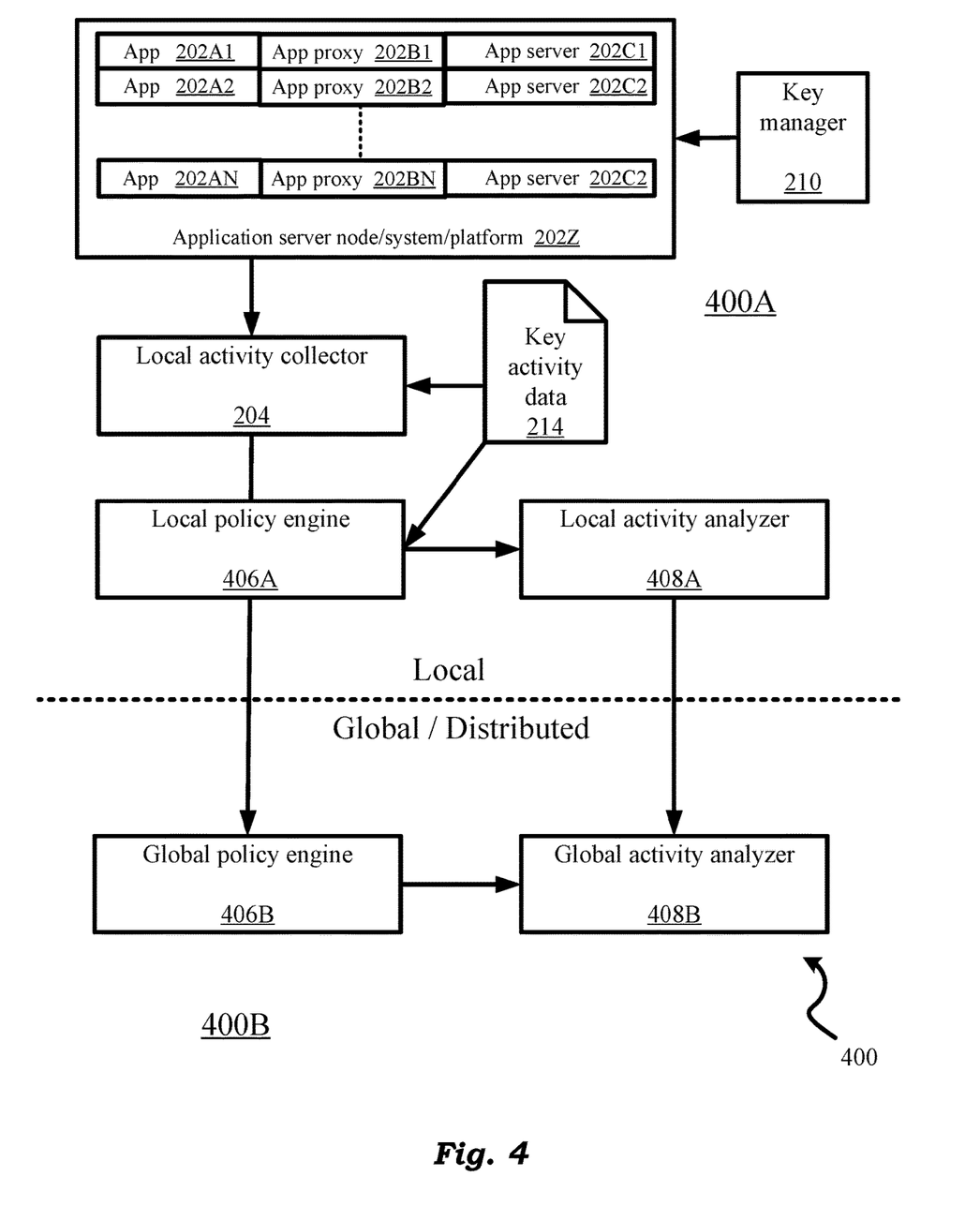
FIG. 4 shows a variation of the threat monitoring system of FIG. 2 that is deployed in a distributed environment consisting of remote or local and separate central or global environments.

The key architectural difference between embodiment 200 of FIG. 2 discussed in detail above, and distributed embodiment 400 of FIG. 4 is that there are local and global counterparts of the policy engine and the activity analyzer. More specifically, there is a local policy engine 406A at site 400A and there is a global policy engine 406B in the global or distributed environment of 400B. Similarly, there is a local activity analyzer 408A at remote site 400A and there is a global activity analyzer 408B in the central/corporate/global/distributed environment of 400B.

In the distributed deployment/implementation of FIG. 4, local policy engine 406A is a local service or module running on every system at site 400A that is accessing or generating sensitive data/information that needs to be protected. It is a simplified version of policy engine 206 of FIG. 2. Local policy engine 406A is not allowed to or capable of making policy definitions/entries/updates/changes. However, working in conjunction with local activity analyzer 208A discussed further below, it is able to monitor key activity against policies that are critical to site 400A locally and raise appropriate alerts. Local modules/services 406A and 408A can perform this local monitoring in the absence of network connectivity between environments 400A and 400B.

Local policy engine 406A applies/compares local key activity data 214 at site 400A against the locally critical policies. Per prior teachings, it then reports any violations or alternatively all key activity data to local activity analyzer 408A. In a manner similar to local policy engine 406A, local activity analyzer 408A is a local service/module running on every system at site 400A that is accessing or generating sensitive data/information that needs to be protected.

When network activity to the "higher level" systems in global environment 400B is lacking, local activity analyzer 408A together with local policy engine 406A monitor key activity against locally critical policies. This allows threat monitoring system 400 to respond to critical threats in remote and/or disconnected environments. Any violations are reported by local activity analyzer 408B via appropriate alerts to the designated authorities at site 400A. Instead of or in addition, in case of violations, any appropriate downstream systems and/or applications are updated and any requisite incident response policies activated.

In some variations, there may also be a local enforcement of these policies afforded by local policy engine 406A and local activity analyzer 408A. This enforcement by modules 406A/408A includes denying the key activities or requests that would cause policy violations. When connection to global environment 400B is restored, local activity analyzer 408A updates its global counterpart or global activity analyzer 408B that is in charge of analyzing key activity data from all remote sites. After a local analyzer, such as analyzer 408A of FIG. 4 has updated global activity analyzer 408B with all key activity data 214 since its last "synching", it can then purge its local log(s). In a similar fashion, local policy engine 406A may perform any necessary synchronization with global policy engine 406B when network connectivity is working.

In the distributed implementation of FIG. 4, global policy engine 406B and global activity analyzer 408B are analogous to activity collector 204 and policy engine 206 respectively of FIG. 2. In other words, policy engine 406B has full or complete policy management and monitoring capabilities while its local counter part policy engine 406A may have a subset of its capabilities as required for site 400A. Similarly, activity analyzer 408B has complete analytical and alerting capabilities while its local counterpart activity analyzer 408A may have a subset of its capabilities as required for site 400A. In still other variations, the capabilities of local policy engine 406A and local activity analyzer 408A are completely tailored according to the requirement of site 400A.

In various embodiments of the present technology described above, it is important that the application proxy and the activity collector modules/services are implemented efficiently. This is to ensure that they appear transparent to the client application interacting with the instant proxy. This is possible if there is very little performance degradation perceived by the client application.

In addition to the above-described distinguishing features and aspects of the instant key-activity based threat monitoring technology, these are some of its additional salient attributes:

The present design is vendor-agnostic. The instant technology can operate with systems and modules operating on a variety of hardware, software and standards. This includes the KMIP standard or protocol.

The design is also application-agnostic. Key activity-based monitoring techniques taught herein can be applied to detect threats to data based on key activities performed by a variety of applications.

The present technology uniquely monitors encryption key activity and events and relates them to storage objects that are protected by these encryption keys.

Based on the instant design per above teachings, policy definitions do not require specialized technical and software security knowledge.

In a similar manner, key activity analysis/interpretation and enforcement of consequent actions do not require specialized technical and software security knowledge.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer system comprising computer-readable instructions stored in a non-transitory storage medium and at least one microprocessor coupled to said storage medium when executing said computer-readable instructions, said computer system comprising:

(a) an application proxy operating on an application server and intercepting key activity generated by an application operating on said application server, said key activity destined for a key manager and involving an encryption key and a storage object associated with said encryption key;
(b) an application programming interface (API) of an activity collector for securing in a log, key activity data representing said key activity, wherein said key activity data is correlated to object data associated with said storage object;
(c) a policy engine for defining one or more security policies and for determining if said key activity is in violation of said one or more security policies; and
(d) an activity analyzer service for alerting one or both of a designated user and an application about said violation.

2. The computer system of claim 1, wherein said application proxy is a service operating on every node of a networked computing environment.

3. The computer system of claim 1, wherein said key activity comprises a volume-create event and a volume-attach event.

4. The computer system of claim 1, wherein said log is one or both of an unmodifiable log and an append-only log.

5. The computer system of claim 1, wherein each of said one or more security policies comprise one or more policy entries for specifying when said key activity is in violation of said each of said one or more security policies.

6. The computer system of claim 5, wherein said policy engine contains a user interface for creating said one or more of policy entries.

7. The computer system of claim 1, wherein said activity analyzer service performs further analysis on said key activity data.

8. The computer system of claim 1, wherein said key manager is a key management interoperability protocol (KMIP) compliant key manager.

9. The distributed computer system of claim 8, wherein said network connectivity between said local site and said global site is unreliable.

10. A distributed computer system comprising computer-readable instructions stored in a non-transitory storage medium and at least one microprocessor coupled to said storage medium when executing said computer-readable instructions, said computer system further comprising a local site and a global site, said local site comprising:
(a) an application proxy operating on an application server and intercepting key activity generated by an application operating on said application server, said key activity destined for a key manager and said key activity involving an encryption key and a storage object associated with said encryption key;
(b) an application programming interface (API) of an activity collector for securing in a log, key activity data representing said key activity, wherein said key activity data is correlated to object data associated with said storage object;
(c) a local policy engine for determining if said key activity is in violation of a local policy;
(d) a local activity analyzer module for alerting a designated party at said site about said violation; and
(e) said global site comprising:
(f) a global policy engine for synchronizing with said local policy engine when there is network connectivity between said local site and said global site; and
(g) a global activity analyzer module for synchronizing with said local activity analyzer module when there is said network connectivity between said local site and said global site.

11. A computer-implemented method executing by at least one microprocessor, computer-readable instructions stored in a non-transitory storage medium coupled to said at least one microprocessor, said method comprising the steps of:
(a) intercepting by an application proxy operating on an application server, key activity generated by an application operating on said application server, said key activity destined for a key manager and said key activity related to an encryption key and a storage object associated with said encryption key;
(b) securing by an application programming interface (API) of an activity collector, key activity data representing said key activity, and correlating said key activity data to object data associated with said storage object;
(c) operating a policy engine for defining one or more security policies and for determining if said key activity is in violation of said one or more security policies; and
(d) alerting by an activity analyzer one or both of a designated user and a system, about said violation.

12. The computer-implemented method of claim 11 operating said application proxy as a service on every node of a networked environment.

13. The computer-implemented method of claim 11 including a volume-create event and a volume-attach event in said key activity.

14. The computer-implemented method of claim 11 performing said securing in an unmodifiable and an append-only log.

15. The computer-implemented method of claim 11 including at least one policy entry in each of said one or more security policies, said at least one policy entry specifying when said key activity is in violation of said each of said one or more security policies.

16. The computer-implemented method of claim 15 including a user-interface in said policy engine for creating and updating said at least one policy entry.

17. The computer-implemented method of claim 11 further analyzing said key activity data by said activity analyzer.

18. The computer-implemented method of claim 17 including one or both of machine learning and statistical analysis techniques in said analyzing.

19. The computer-implemented method of claim 11 performing said steps (a) and (b) at a remote site.

20. The computer-implemented method of claim 19 operating a local policy engine and a local activity analyzer for local policy enforcement at said remote site.

* * * * *